Jan. 8, 1963  H. J. SCHWERDHÖFER  3,071,986

PLANET-GEAR CARRIER

Filed Feb. 23, 1962

INVENTOR:
HANS JOACHIM SCHWERDHÖFER
By
Edmund M. Squire
ATTY.

United States Patent Office 3,071,986
Patented Jan. 8, 1963

3,071,986
PLANET-GEAR CARRIER
Hans Joachim Schwerdhöfer, Schweinfurt (Main), Germany, assignor to Fichtel & Sachs A.G., Schweinfurt (Main), Germany, a corporation of Germany
Filed Feb. 23, 1962, Ser. No. 175,154
Claims priority, application Germany Feb. 24, 1961
5 Claims. (Cl. 74—802)

The present invention relates to a carrier for the planet gears which form a part of the planetary gearing in a multi-speed coaster brake and to methods for making such planet carriers.

The planet carrier of the present invention provides unusual strength and compactness as compared with conventional planet carriers for this type of service. Such a coaster brake is disclosed in my Patent No. 2,895,576 issued on July 21, 1959. The usual planet carrier has a body including a flange portion to which the shafts for the planet gears are attached, one end of each shaft being rigidly secured to the flange portion. In the high speed condition of the gearing, the planet gears are driven by torque applied to the free ends of the shafts. As a result, the shafts must be large enough and sufficiently securely fastened to the flange portion of the carrier body to withstand the bending moments accompanying torque transmitted to the planet gears from the free ends of their shafts. This condition prevails even when a common ring member interconnects the free ends of the shafts.

In the present invention, a common ring member is permanently mounted on integrally formed bosses which extend axially from the flange portion of the carrier body. The bosses are shouldered to provide stud portions which are riveted over to secure the common ring member to the carrier body. After assembly, axially aligned holes are drilled in the flange portion and ring member to receive the shafts for the planet gears, whereafter the assembly is hardened. After hardening, these holes are precision honed and other critical finished surfaces are ground. The planet gears are then positioned between the flange portion of the body and the ring member. The shafts are then inserted in the gears. The shafts are held in place by a retaining collar and a snap ring.

Various objects, features and advantages of the invention will become apparent upon reading the following specification together with the accompanying drawing forming a part hereof.

Referring to the drawing.

Figure 1:
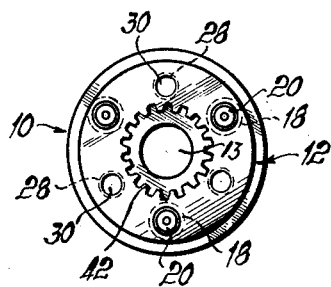
FIGURE 1 is an end view of a planet carrier embodying the invention with the planet gears and their shafts removed.
Figure 2:
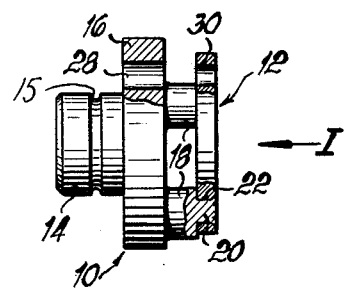
FIGURE 2 is a side elevational view of the planet carrier of FIG. 1, partly broken away to illustrate details of construction.
Figure 3:
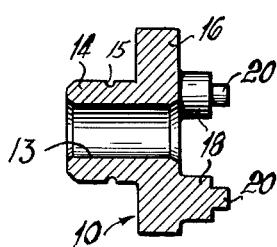
FIGURE 3 is a view in axial section of the body portion of the planet carrier of FIG. 1.
Figure 4:
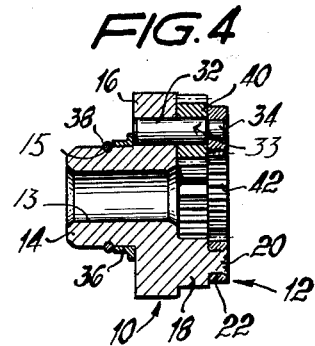
FIGURE 4 is a view in axial section of the planet carrier of FIG. 1, completely assembled with the planet gears and their shafts in place.

Referring to FIGS. 1 and 2, the planet carrier comprises a body portion designated generally as 10 and a ring member designated generally as 12. The body portion 10 has an axially extending cylindrical bore 13 formed therein which freely revolubly receives the stationary main shaft (not shown) of the coaster brake. The body portion 10 includes a hub portion 14 which is encircled by a groove 15 of semicircular cross-section. The body portion 10 also includes a flange portion 16. A regularly circularly arranged series of bosses 18 is integrally formed on the flange portion 16. The bosses 18 are symmetrically arranged with respect to the rotational axis of the planet carrier 10, 12 as defined by the bore 13.

Each boss 18 extends axially outwardly from the flange portion 16 and is shouldered near its free end to provide an axially outwardly extending stud portion 20 of circular cross-section the axis of which is parallel to the rotational axis of the body portion 10. The ring member 12 has a first regularly circularly arranged series of holes 22 (FIG. 5) formed therein which are tapered at 24 to flare outwardly. The holes 20 in the ring member 12 are arranged to receive the stud portions 20 of the bosses 18. When assembled in a riveting press, indentations 26 are formed in the free ends of the stud portions 20 so that they become enlarged and fill the flaring portions 24 of the holes 20. The ring member 12 is thus positively and permanently secured to the bosses 18.

After assembly, a series of regularly circularly arranged holes 28 is drilled in the flange portion 16 each intermediate two adjacent ones of the bosses 18. A second regularly arranged series of holes 30 (FIG. 2) is also drilled in the ring member 12. Each hole 30 is in axial alignment with one of the larger holes 28 in flange portion 16. The larger hole 30 is dimensioned to receive the larger diameter portion 32 of planet gear shaft designated generally as 33. The shaft 33 is shouldered to provide a smaller diameter portion 34 which fits into the axially aligned smaller hole 30 formed in the ring member 12. The reduced diameter portions 34 of shafts 33 are slightly tapered to provide a positive fit without play in the holes 30. The larger diameter portions 32 have a sliding fit in the holes 28 with a minimum of play. The shafts 33 are held against axial movement out of the holes 28 and 34 by a retaining collar 36 which partially covers the holes 28. The retaining collar 36 is held in place by a snap ring 38 fitted in the groove 15. Planet gears 40 are freely revolubly mounted on the larger diameter portions 32 of the shafts 33 between the flange portion 16 and the ring member 12.

Internal spline teeth 42 are formed on the ring member 12 and are adapted for engagement with an axially displaceable coupling member, as shown in application Serial No. 149,584 filed on November 2, 1961. The coupling member has complementary external spline teeth which engage the spline teeth 42 when it is desired to transmit driving torque to the planet gears 40 through the planet carrier in the high speed condition of the coaster brake.

Figure 5:
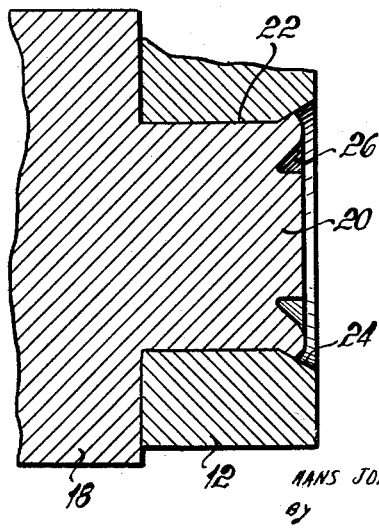
FIGURE 5 is an enlarged fragmentary view in axial section showing the connection between one of the bosses and the ring member.

The planet carrier is manufactured in the following manner:

A stack of ring members 12 is machined by a broaching tool to form the spline teeth 42. The first series of holes 30 is also drilled in the stack. The bosses 18 of the body portion 10 are machined to form the stud portions 20 which fit into the holes 30 in the ring member 12. A ring member 12 and a body portion 10 are then assembled and riveted together in a suitable press to form a permanent connection as shown in FIG. 5.

After assembly of the body 10 and ring member 12, the coaxial holes 28 and 30 are drilled using a suitable jig. After the drilling operation has been completed, the assembly is hardened by appropriate heat treatment. After hardening, critical dimensions are obtained by grinding, including a honing of the holes 13, 28 and 30 to bring their internal diameters within the permissible tolerances. The planet gears 40 are then mounted between the flange portion 16 and the ring member 12 and the shafts 33 are inserted. The retaining collar 36 is then slid over the hub portion 14 and the snap ring 38 is positioned in the groove 15 to hold the retaining collar 36 in position. The retaining collar 36, in turn, holds all of the shafts 33 against axial movement out of the holes 28 and 30.

The free end portion of the hub 14 is shown smooth. If desired, for use in a coaster brake where the braking action is produced by back pedaling, a helical thread may be formed on the outer surface of the hub 14 extending from its free end toward the groove 15.

While I have shown and described what I believe to be the best embodiment of my invention, it will be apparent to those skilled in the art that various modifications may be made therein without departing from the spirit and scope of the invention as defined in the appended claims.

What is claimed is:

1. A planet carrier of the class described, comprising: a rotatable body portion including a flange portion; a regularly circularly arranged series of bosses integrally formed on said flange portion, each boss being shouldered to provide an axially extending stud portion of reduced diameter and circular cross-section the axis of which is parallel to the rotational axis of said body portion, said flange portion having a regularly circularly arranged series of holes formed therein each intermediate two adjacent ones of said bosses; a ring member fixedly mounted on said bosses concentrically with said rotational axis, said ring member having a first regularly circularly arranged series of holes formed therein each of which receives one of said stud portions and a second regularly arranged series of holes each in axial alignment with one of said holes in said flange portion; a shaft extending axially from each hole in said flange portion into an aligned hole of said second series in said ring member; means restraining each shaft against axial movement out of said holes; and a planet gear freely revolubly carried by each of said shafts between said flange portion and said ring member.

2. A planet carrier according to claim 1, wherein an outer end portion of each hole of said first series is enlarged to flare outwardly, each stud portion being enlarged at its free end to fill said outer end portion of said hole wherein it is received, whereby said ring member is fixedly mounted on said bosses.

3. A planet carrier according to claim 1, wherein said ring member has internal spline teeth formed thereon, said spline teeth being engageable by a complementarily externally toothed coupling member.

4. A planet carrier according to claim 1, wherein the diameter of each hole in said flange portion is different from the diameter of the aligned hole of said second series, and in which each shaft is shouldered intermediate its ends to provide portions of different diameters which fit said aligned holes, said shouldering preventing axial movement of said shaft out of said holes in one direction, said restraining means preventing axial movement of said shaft in the direction opposite to said one direction.

5. A planet carrier according to claim 4, wherein the holes of larger diameter are formed in said flange portion and said shouldering abuts said ring member, said restraining means comprising collar means carried by said body portion and which at least partially closes said holes of larger diameter beyond the ends of the larger diameter portions of said shafts.

References Cited in the file of this patent

UNITED STATES PATENTS

| | | |
|---|---|---|
| 1,974,230 | Armington | Sept. 18, 1934 |
| 2,093,325 | Lansing | Sept. 14, 1937 |
| 2,656,594 | Westling | Oct. 27, 1953 |
| 2,704,395 | Heidegger | Mar. 22, 1955 |